Aug. 18, 1942.  W. R. HARRY  2,293,258
ACOUSTIC DEVICE
Filed Nov. 24, 1939  2 Sheets-Sheet 1

INVENTOR
W. R. HARRY
BY
Walter C. Kiesel
ATTORNEY

INVENTOR
W. R. HARRY
BY
Walter C. Kiesel
ATTORNEY

Patented Aug. 18, 1942

2,293,258

UNITED STATES PATENT OFFICE 2,293,258

ACOUSTIC DEVICE

William R. Harry, New York, N. Y., assignor to Bell Telephone Laboratories, Incorporated, New York, N. Y., a corporation of New York Application November 24, 1939, Serial No. 305,799

1 Claim. (Cl. 179—1)

This invention relates to acoustic devices and more particularly to sound pick-up or transmitter devices having unidirectional response characteristics.

Sound pick-up or transmitter devices, that are ordinarily designated as unidirectional, have maximum sensitivity to sound from one direction and a much lower sensitivity to sound from the opposite direction. Some of the known unidirectional transmitters comprise means responsive to both the pressure and the pressure gradient of impinging sound waves, whereby the response to sound from directly in front is maximum and to sound from directly in the rear is zero. The response to sound from points intermediate these two extremes is such that the curve indicative of the response of the transmitter, determined by a plot of response against angle, is a cardioid. Such transmitters may be said to have a cardioid response characteristic or a cardioid sensitivity pattern.

For convenience of description the direction for which the sensitivity is maximum may be designated as the 0 degree position or direction and that for which the sensitivity is zero as the 180 degree position or direction. Furthermore, since the sensitivity pattern is a figure of revolution about the 0 degree–180 degree axis, consideration of a plane through this axis is sufficient for most purposes. In such a plane, the response is high at the front, that is, between the 0 degree and 90 degree and the 0 degree and 270 degree positions, and low at the rear or between the 180 degree and 90 degree positions, and the 180 degree and 270 degree positions. Moreover, the response is very low over a given angle less than 90 degrees on either side of the 180 degree position. A substantially true cardioid response characteristic may be obtained by proper adjustment and proportioning of the elements of the pick-up device. Transmitters of the type designated in the foregoing are characterized by a directivity index that is substantially 1/3. The directivity index which is a measure of the directionality may be defined as the ratio between transmitter sensitivity to random sounds and to sounds from the front or direction of maximum response. As will be obvious from the foregoing definition of directivity index, an increase in the denominator of the fraction indicating the value of said index indicates improved directionality. For example, the directivity indices for a non-directional transmitter, a bidirectional transmitter and a unidirectional transmitter may be respectively 1/1, 1/3, and 1/3.

One object of this invention is the production of unidirectional sound pick-up devices having improved directionality characteristics that are substantially independent of the frequency of the impinging sound waves.

Another object of this invention is to improve the directionality of unidirectional sound pick-up devices of the type having substantially a cardioid response characteristic as described in the foregoing.

A further object of this invention is to modify a unidirectional transmitter of the type having minimum sensitivity at the median rear or 180 degree position, in a manner to obtain a plurality of axes of minimum sensitivity at the rear.

In accordance with one feature of this invention, sound pick-up devices may be constructed to have any desired directivity index between 1/1 and 1/4.

Another feature of the invention resides in a sound pick-up device having adjustable means for setting the directivity index at any desired value between 1/1 and 1/4.

A further feature of the invention involves a unidirectional transmitter having a plurality of axes of minimum sensitivity arranged symmetrically about the 180 degree position and making therewith any desired angle between 0 degrees and 90 degrees.

Another feature of this invention includes the use of impedance means associated with the sound responsive means of a unidirectional transmitter for controlling the directivity index and the minimum response direction or directions thereof.

Other and further objects and features of this invention will be understood more clearly and fully from the following detailed description with reference to the accompanying drawings in which.

Figure 6:
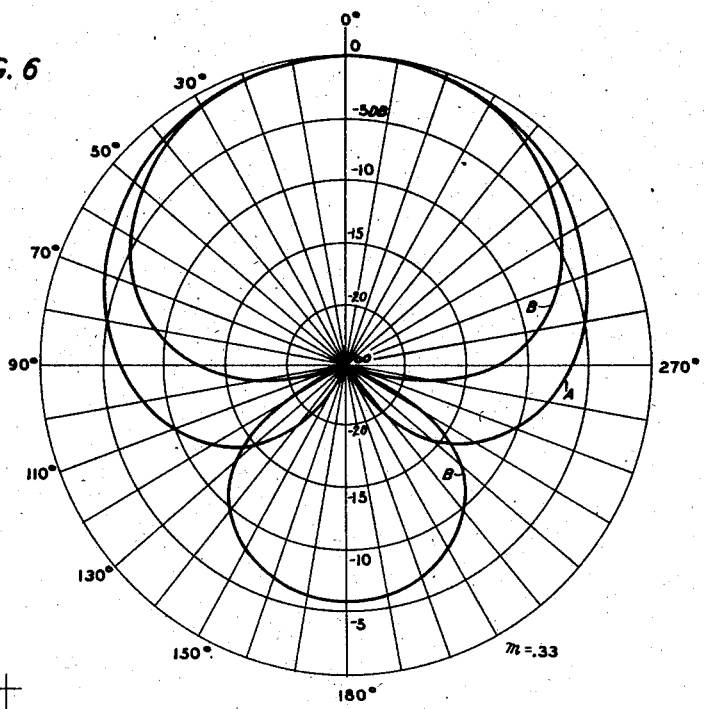
Figure 7:
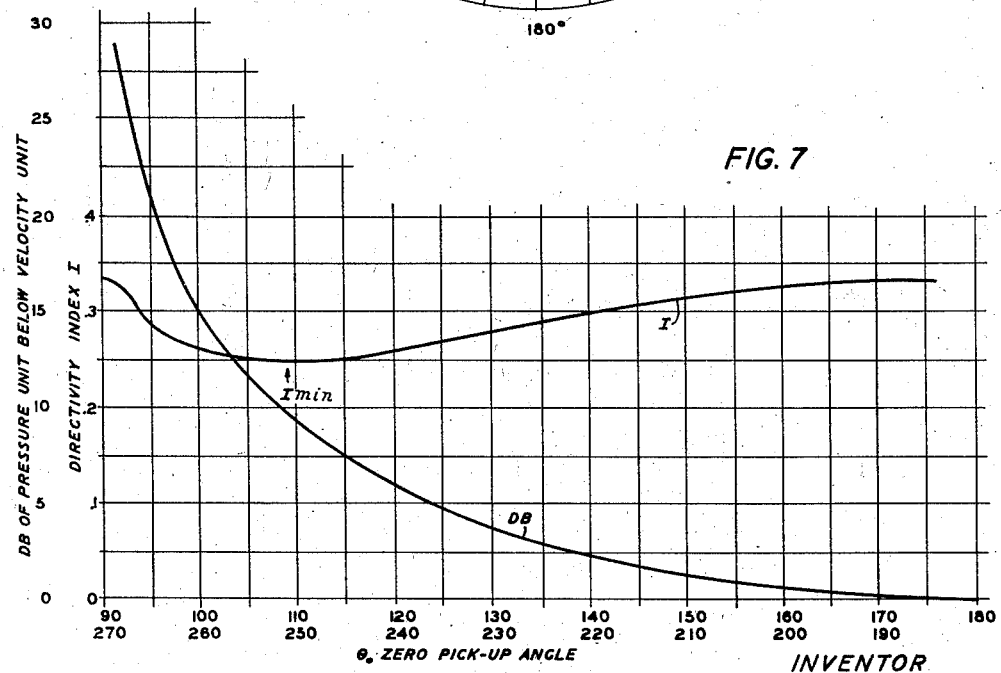

Fig. 6 is a plot on a decibel scale showing the directional characteristics of a true cardioid transmitter and one modified in accordance with this invention; and Fig. 7 is a plot showing the relation between the directivity index and a factor representative of the relative outputs of the pressure and pressure gradient elements of a unidirectional transmitter made in accordance with this invention.

Figure 1:
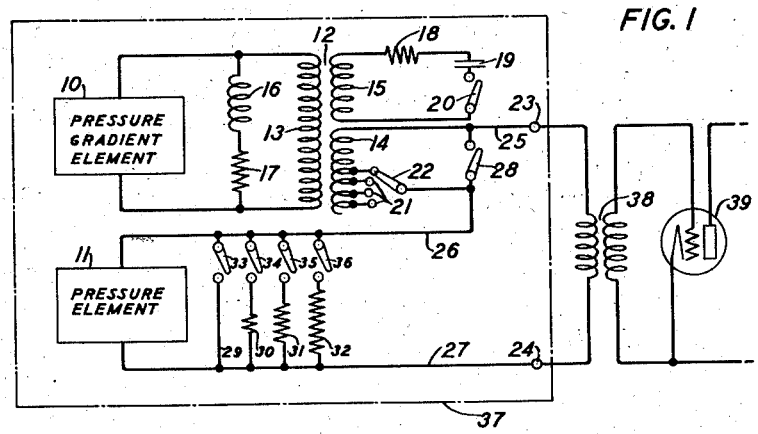
Fig. 1 is a wiring diagram illustrating one modification of this invention.

Referring to Fig. 1 of the drawings, 10 and 11 designate sound pick-up elements responsive respectively to the pressure gradient and the pressure of incident sound waves. The elements 10 may be a bidirectional pick-up device such as the so-called ribbon velocity microphone. The pressure element 11 may be a moving coil or other type of pressure responsive transmitter or pick-up. The unidirectional transmitter disclosed in application Serial No. 216,684 filed June 13, 1938 by William R. Harry and Robert N. Marshall now Patent 2,227,580 issued Jan. 7, 1941, and comprising one each of such elements, is particularly suitable.

The bidirectional element 10 may have its output connected to the primary winding 13 of a transformer 12, which may have a secondary winding 14 and a tertiary winding 15. An inductor 16 and resistor 17 may be connected across the terminals of transmitter element 10. The resistance represented by 17 may be included in the winding of the inductor 16 or the primary winding 13 of transformer 12 may be designed to include both of these impedances. A resistor 18, capacitor 19, and switch 20 may be serially connected to the tertiary winding 15 of the transformer 12. The secondary winding 14 of the transformer may be provided with a plurality of taps 21 to which connection may be made by means of switch arm or contactor 22. The transformer secondary 14 may be connected in series with the pressure transmitter element 11 and to ouptut terminals 23 and 24 by conductors 25, 26 and 27. The secondary winding and hence the bidirectional transmitter element may be shunted by means of a switch 28. A plurality of shunting means 29, 30, 31 and 32 may be connected across the output of the pressure element 11 between conductors 26 and 27. The shunting elements may be connected in circuit by means of switches 33, 34, 35 and 36 or other suitable means such as a multicontact switch. The shunt 29 is of very low resistance for short-circuiting element 11 when desired. The resistors 30, 31 and 32 may have different values for introducing more or less attenuation into the output of transmitter 11. The elements described in the foregoing may be conveniently housed in a single casing as indicated by the broken line 37, thereby comprising a unitary, unidirectional transmitter or pick-up device. This transmitter may have its terminals 23 and 24 connected to an output transformer 38 and thence to a suitable amplifier represented by its first tube 39.

The impedances 16, 17 and 15, 18, 19 comprise respectively low frequency and high frequency equalizing means as is more fully pointed out in the prior Harry et al. application Serial No. 216,684. In order to obtain as near as possible a cardioid characteristic over a considerable portion of the desired frequency range, the sound pick-up means just described is adjusted so that there is complete cancellation between the pressure gradient and pressure element for sound from the 180 degree position or directly in the rear. The substantially true cardioid characteristic may be obtained by having switch 20 closed and switches 28, 33, 34, 35 and 36 open, with contactor 22 set on a tap 21 to give the desired complete cancellation at the 180 degree position.

The equation of a true cardioid such as curve A of Fig. 6 may be written $$E = k(1 + \cos \theta) \qquad (1)$$

where $E$ equals transmitter output, $k$ equals a constant of proportionality and $\theta$ equals the angle of sound incidence. Curve A has for convenience been shown as plotted to a decibel scale rather than on the basis of the above equation.

The adjustment giving the foregoing curve has heretofore been considered optimum. However, in accordance with this invention it has been found that other adjustments offer improvements in directional characteristic for some conditions. If the sensitivity of the pressure gradient element is held constant, and the output of the pressure element is adjusted to some value $m$, the output may be represented by $$E = k(m + \cos \theta) \qquad (2)$$

If then, $m$ is adjusted to some value less than 1, the directional characteristic will assume a form different from a cardioid, for example, that shown by curve B (plotted on a decibel scale) of Fig. 6. A reduction of $m$ below 1 will have two effects. First, there will be two angles in each plane through the 0 degree–180 degree axis, symmetrically disposed with respect to the 180 degree position, for which the sensitivity is zero. Second, there will be an increase in the solid angle at the rear of the microphone for which the sensivity is substantially reduced. Moreover, it is evident that, as the value of $m$ is reduced, the angles of zero sensitivity diverge. In the extreme case of $m = 0$ only the pressure gradient element is in circuit and the angles of zero sensitivity fall at 90 degrees and 270 degrees.

Consideration of the directivity index provides a basis for a valuation of the advantage gained by a reduction of $m$ and the selection of an optimum value of $m$. In the general case, the directivity index $I$ is defined as $$I = \frac{\text{efficiency for sound of random incidence}}{\text{efficiency for sound of normal incidence}}$$

which may be written $$I = \frac{1}{4\pi} \int_0^{4\pi} f^2(\theta) d\theta \qquad (3)$$

where $f(\theta)$ is sensitivity which is a function of the angle of incident sound $\theta$. For the case of a microphone or transmitter where $E = k(m + \cos \theta)$ it may be shown that this reduces to $$I = \frac{1 + 3m^2}{3 + 6m + 3m^2} \qquad (4)$$

In Fig. 7 $m$ (plotted in decibels) and the directivity index have been plotted against the angles of zero sensitivity. From this it may be seen than for $m = .33$ (pressure element 9.6 decibels below pressure gradient element output) the directivity index is 1/4 as compared with the previously indicated values of 1/3 for both the true cardioid and for the pressure gradient element alone. This represents a distinct improvement when the microphone is used for sound pick-up under reverberant conditions.

When a transmitter of this type is used for sound reinforcement, such as in public address systems, the problem is somewhat more complex. The amount of reinforcement which may be employed is limited by singing, where sound, either direct from the loud-speaker or originating at the loud-speaker and reflected by nearby surfaces reaches the transmitter. Under these conditions, the optimum value $m$ may be different from that which gives the lowest directivity index. Here it will be necessary to choose a value which provides the best compromise between minimum sensitivity for sound arriving directly from the loud-speaker (a discrete angle) and low sensitivity for the more diffuse reflected sound.

The sound pick-up means illustrated in Fig. 1 is adapted to adjust the value of $m$ which is representative of the relative output of the two pick-up elements 10 and 11, in several ways. For the true cardioid characteristic obtained by the adjustment previously indicated, $m=1$. The value of $m$ may be reduced below 1 by closing one or more of switches 33 to 36, inclusive, to reduce the output of the pressure element 11. When switch 33 is closed to short circuit element 11 the value of $m$ becomes zero and the figure 8 pick-up pattern characteristic of the bidirectional microphone or transmitter is obtained. By connecting one or more of the resistors 30, 31 and 32 in circuit, a pick-up pattern such as represented by curve B of Fig. 6 will be obtained. The value of $m$ may also be adjusted by means of the taps 21 and contactor 22. In this case a tap is chosen that will make the output of the element 10 high with respect to that of element 11. Various combinations of the foregoing adjustments may be employed to secure the desired pick-up characteristic. Other equivalent output adjusting means may also be employed to control the relative contributions of the two sound responsive elements to the total output. For example, a continuously variable attenuator could be connected to the output of one or both of the pick-up elements 10 and 11. Where a transmitter is desired having a certain fixed directivity index and/or direction of zero response, the bi-directional and non-directional transmitter elements may be designed to have the proper relative response without the use of exterior attenuating means.

Figure 2:
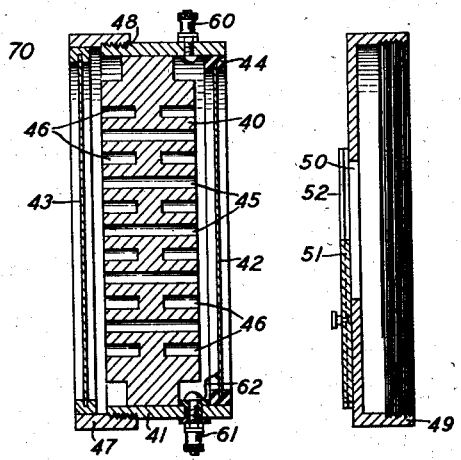
Fig. 2 is a sectional view of a transmitter embodying another modification of the invention.

The foregoing technique may be extended to produce similar modifications of the directional characteristics of other types of unidirectional microphones, for example, one of type shown in Fig. 2.

Referring to Fig. 2 there is shown a pick-up device 70 which depends for its directivity upon the phase shift through an acoustical and mechanical network consisting of a resistance and a stiffness. The pick-up device, as illustrated, is a condenser type transmitter. A stationary electrode 40 may be secured in a casing 41 having diaphragms 42 and 43 attached thereto. Diaphragm 42, which may be called the front diaphragm, is insulated from casing 41 by mounting means 44 of insulating material. The electrode 40 and diaphragm 42 are included in the electrical circuit of the transmitter but the back diaphragm 43 is not, its function being acoustic only.

Electrode 40 is provided with a plurality of through orifices 45 allowing communication between the front and back diaphragms. A plurality of orifices 46 passing only partly through the electrode 40 provide acoustic impedance cavities.

The back diaphragm 43 is mounted on a ring member 47 which may be adjustably secured to casing 41, as by means of screw thread 48. This feature allows an adjustment of the spacing between electrode 40 and back diaphragm 43 for a purpose to be presently set forth.

Figure 5:
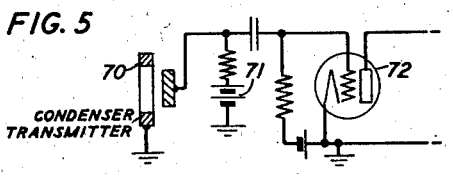
Fig. 5 is a wiring diagram illustrating one way of connecting the transmitter of Fig. 2 to an output circuit.

Electrical connection may be made to the transmitter by means of terminals or binding posts 60 and 61. The terminal 60 makes electrical connection to the electrode 40 through the casing 41. A conductor 62 connects the diaphragm 42 to terminal 61, which is insulated from the casing 41. As shown in Fig. 5, the pick-up device or transmitter 70 may be associated with a source of biasing potential, such as battery 71, and may be connected to suitable amplifying means represented by vacuum tube 72.

The normal operation of this transmitter, that is, the operation providing a substantially cardioid pick-up pattern, may be described as follows: Sound arising from the rear will, because of the difference in path, reach the back diaphragm somewhat before it reaches the front surface of the front diaphragm. The back diaphragm is normally spaced very close to the electrode so that the viscosity of the air between them constrains the diaphragm to move in phase with the sound pressure. That is, this diaphragm functions as a series acoustic resistance. At the same time the volume of air in the orifices 45 provides a shunt compliance and this in combination with the resistance contributed by the back diaphragm constitutes a phase shifting network. Thus, the phase of the sound pressure reaching the rear surface of the front diaphragm is delayed. In the normal adjustment of the instrument this phase shift is made equal to the delay due to path difference between the front and rear of the transmitter. Thus, the pressure will be the same on both sides of the front diaphragm and there will be no motion and hence no output. It is apparent that as the direction of the incident sound is changed the delay due to path difference will be reduced and the sensitivity of the transmitter will increase to a maximum for sound from directly in front.

The phase shift of the network comprising the back diaphragm and the orifices 45 may be adjusted by variation of the compliance of the air in the orifices 45, that is, by varying the volume contained in these orifices, and by variation of the resistance supplied by the back diaphragm. This is determined by the separation of the diaphragm from the electrode 40 and by the number and size of all of the orifices both 45 and 46.

To obtain a modified directional characteristic, wherein the minimum sensitivity occurs at some angle other than 180 degrees it will be necessary to reduce the phase shift produced by the back diaphragm and the orifices 45 to an amount equal to the path delay difference at the new angle of minimum sensitivity. This may be done by increasing the compliance due to the orifices 45 or by decreasing the resistance due to the back diaphragm. The compliance of the orifices 45 may be increased by increasing their volume. The resistance may be reduced either by increasing the number of orifices 45 and 46 or by increasing the separation of the rear diaphragm from the electrode 40. Any suitable combination of the above adjustment may be employed. Where it is desirable to have the directional characteristics adjustable the screw-threaded mounting ring 47 provides a convenient means for varying the spacing between the back diaphragm 43 and electrode 40.

A modification of this type of transmitter may be made by employing the resistance of a narrow slot in place of the resistance due to the back diaphragm 43. Such a resistance slot may be provided by means illustrated in Figs. 3 and 4. A cover member 49 adapted to replace the mounting ring 47 on casing 41 may be provided with a slot 50. An adjustable slide 51 mounted in guideways 52 may be provided for varying the effective size and thus the resistance of slot 50. This slot which would be ordinarily very narrow in practice is shown somewhat exaggerated in width in the interest of clarity of illustration. Other suitable means may be provided for adjusting the resistance of the slot 50. Variation of the size of the slot 50 will produce an effect equivalent to that obtained by changing the spacing between diaphragm 43 and electrode 40. Obviously, other means than those illustrated may be employed for adjusting the size of slot 50. The slot 50 may also be proportioned to give a particular, desired directional characteristic and no provision made for adjustment.

Figure 3:
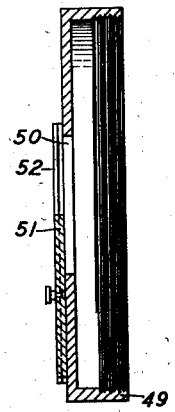
Figs. 3 and 4 are respectively sectional and elevational views of a modified cover means for the device of Fig. 2 and which, when used therewith, embodies a further illustrative modification of the invention.
Figure 4:
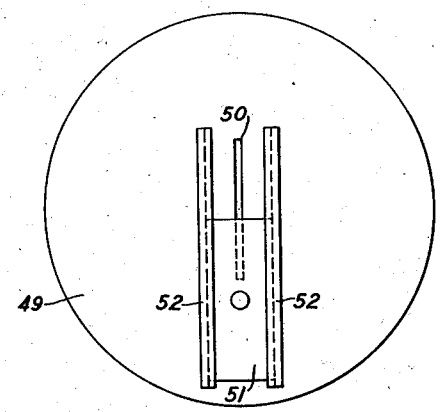

In devices of the type illustrated in Figs. 2, 3 and 4 a reduction of the resistance in the phase network will reduce the phase shift which will have an effect similar to the reduction of the value of $m$ in the combination type transmitter.

The foregoing features as set forth with respect to the transmitter illustrated in Figs. 2 to 5, inclusive, are not limited to the condenser type structure shown. Other voltage generating or modulating means may be associated with a sound responsive element such as diaphragm 42 and with appropriate acoustic impedance means to produce equivalent results.

Although the invention has been disclosed with reference to specific embodiments thereof, it will be understood that it is not restricted thereto but is limited in scope by the appended claim only.

What is claimed is:

A sound pick-up device comprising a ribbon velocity transmitter, a moving coil pressure transmitter, a pair of output terminals, a transformer having a primary winding and a secondary winding, a plurality of resistors, and switching means associated with said resistors, said transformer having its primary winding connected to the output of the velocity transmitter, the secondary winding connected serially with the moving coil transmitter and the output terminals, said switching means serving to connect one or more of said resistors in parallel with said moving coil transmitter for reducing the output thereof, thereby improving the directionality of the pick-up device.

WILLIAM R. HARRY.